US012628068B2

(12) United States Patent　(10) Patent No.: US 12,628,068 B2
Liu et al.　(45) Date of Patent: May 12, 2026

(54) COMMUNICATION METHOD, SYSTEM, BASE STATION, AND TERMINAL

(71) Applicant: CHINA TELECOM CORPORATION LIMITED, Beijing (CN)

(72) Inventors: Shengnan Liu, Beijing (CN); Zheng Jiang, Beijing (CN); Peng Chen, Beijing (CN); Xiaoming She, Beijing (CN)

(73) Assignee: CHINA TELECOM CORPORATION LIMITED, Beijing (CN)

( * ) Notice: Subject to any disclaimer, the term of this patent is extended or adjusted under 35 U.S.C. 154(b) by 1051 days.

(21) Appl. No.: 17/772,335

(22) PCT Filed: Jul. 13, 2020

(86) PCT No.: PCT/CN2020/101569
§ 371 (c)(1),
(2) Date: Apr. 27, 2022

(87) PCT Pub. No.: WO2021/082528
PCT Pub. Date: May 6, 2021

(65) Prior Publication Data
US 2022/0417834 A1　Dec. 29, 2022

(30) Foreign Application Priority Data

Oct. 30, 2019　(CN) .......................... 201911042165.4

(51) Int. Cl.
*H04W 48/10*　(2009.01)
*H04W 36/00*　(2009.01)
(Continued)

(52) U.S. Cl.
CPC ........ *H04W 48/10* (2013.01); *H04W 36/0011* (2013.01); *H04W 76/11* (2018.02); *H04W 36/14* (2013.01)

(58) Field of Classification Search
None
See application file for complete search history.

(56) References Cited

U.S. PATENT DOCUMENTS

2009/0094680 A1　4/2009　Gupta et al.
2010/0161794 A1　6/2010　Horn et al.
(Continued)

FOREIGN PATENT DOCUMENTS

CN　110213808　9/2019
CN　110536293 A　12/2019
(Continued)

OTHER PUBLICATIONS

Intel Corporation: "RAN2 impact on Non-Public Network Deployment using CAG", 3GPP Draft; R2-1900761—NPN_SOLUTION2_V02, 3rd Generation Partnership Project (3GPP), Mobile Competence Centre ; 650, Route Des Lucioles ; F-06921 Sophia-Antipolis Cedex ; France, vol. RAN WG2, No. Athens, Greece; Feb. 25, 2019-Mar. 1, 2019, pp. 1-6.
(Continued)

*Primary Examiner* — Srinivasa R Reddivalam
(74) *Attorney, Agent, or Firm* — Andrew M. Calderon; Calderon Safran & Wright P.C.

(57) ABSTRACT

The present disclosure relates to a communication method, system, base station, and terminal. The method includes: sending, by a first BS, a broadcast message, wherein the broadcast message comprising: one or more CAG IDs and one or more PLMN IDs supported by the first BS; receiving, by the first BS, a connection request sent from a terminal; establishing, by the first BS, a RRC connection with the terminal according to the connection request; receiving, by the first BS, a RRC connection setup complete message sent from the terminal, wherein the RRC connection setup complete message carries a CAG ID and a PLMN ID, which correspond to a CAG cell that the terminal selects to access;
(Continued)

and allowing, by the first BS, the terminal to access the CAG cell that the terminal selects to access, according to the RRC connection setup complete message.

19 Claims, 5 Drawing Sheets

(51) Int. Cl.
*H04W 36/14* (2009.01)
*H04W 76/11* (2018.01)

(56) References Cited

U.S. PATENT DOCUMENTS

| | | | | |
|---|---|---|---|---|
| 2010/0165867 | A1 | 7/2010 | Nylander et al. | |
| 2016/0337939 | A1 | 11/2016 | Mukherjee et al. | |
| 2016/0344739 | A1* | 11/2016 | Xu | H04W 8/186 |
| 2019/0110244 | A1 | 4/2019 | Shih et al. | |
| 2020/0314701 | A1* | 10/2020 | Talebi Fard | H04W 36/08 |
| 2022/0110009 | A1* | 4/2022 | Liu | H04W 72/20 |
| 2022/0174561 | A1* | 6/2022 | Han | H04W 24/10 |

FOREIGN PATENT DOCUMENTS

| | | |
|---|---|---|
| JP | 2010525752 | 7/2010 |
| JP | 2010537481 | 12/2010 |
| JP | 2010541514 | 12/2010 |
| JP | 2012513732 | 6/2012 |
| KR | 20110003228 A | 1/2011 |

OTHER PUBLICATIONS

Ericsson: "Further aspects of PNI NPN", 3GPP Draft; R2-1912361—Further Aspects of PNI NPN, 3rd Generation Partnership Project (3GPP), Mobile Competence Centre ; 650, Route Des Lucioles ; F-06921 Sophia-Antipolis Cedex ; France, vol. Ran WG2, No. Chongqing, China; Oct. 14, 2019-Oct. 18, 2019, 9 pages.

Nokia et al: "Support for Non-Public Networks", 3GPP Draft; R2-1912842 NPN Stage 2, 3rd Generation Partnership Project (3GPP), Mobile Competence Centre; 650, Route Des Lucioles; F-06921 Sophia-Antipolis Cedex; France, Oct. 2019, 8 pages.

Supplementary European Search Report issued on Oct. 13, 2022 in related European Patent Application No. 20882757.6; 17 pages.

Ericsson, "Overview of Public network integrated NPN (PNI-NPN)", 3GPP TSG-RAN WG2 #107 Tdoc R2-1908978 Prague, Czech Republic, Aug. 26-30, 2019, 11 Pages.

Catt, "Connection and Mobility Issue for UEs in Idle and Inactive Mode", 3GPP TSG-RAN WG2 Meeting #107bis R2-1912154 Chongqing, P.R.China, Oct. 14-18, 2019, 3 Pages.

China Telecom et al., "BL CR for introducing Non Public Netwrok in NG-RAN architecture", 3GPP TSG-RAN WG3#105bis R3-195403 Chongqing, China, Oct. 14-18, 2019, 9 Pages.

Japanese Office Action dated May 9, 2024 in JP Application No. 2022-525748, with English Translation, 11 pages.

International Search Report and Written Opinion issued in corresponding Application No. PCT/CN2020/101569 on Oct. 10, 2020; 18 pages.

ZTE Corporation et al. "Security threats and requirements on CAG ID privacy" 3GPP TSG-SA WG3 Meeting #95Bis S3-192343, Jun. 28, 2019 (Jun. 28, 2019), section 4; 2 pages.

Interdigtial, Inc. "CAG-only indication and empty Allowed CAG list" 3GPP TSG-SA WG2 Meeting #135 S2-1909563, Oct. 18, 2019 (Oct. 18, 2019), section 5.30.3; 3 pages.

Zte et al. "Clarification on the CAG ID and slicing" 3GPP TSG-SA WG2 Meeting #132 S2-1904804, Apr. 12, 2019 (Apr. 12, 2019), section 5.30.3; 4 pages.

Office Action issued in the corresponding Chinese Patent Application No. 201911042165.4 on Mar. 9, 2022; 25 pages.

* cited by examiner

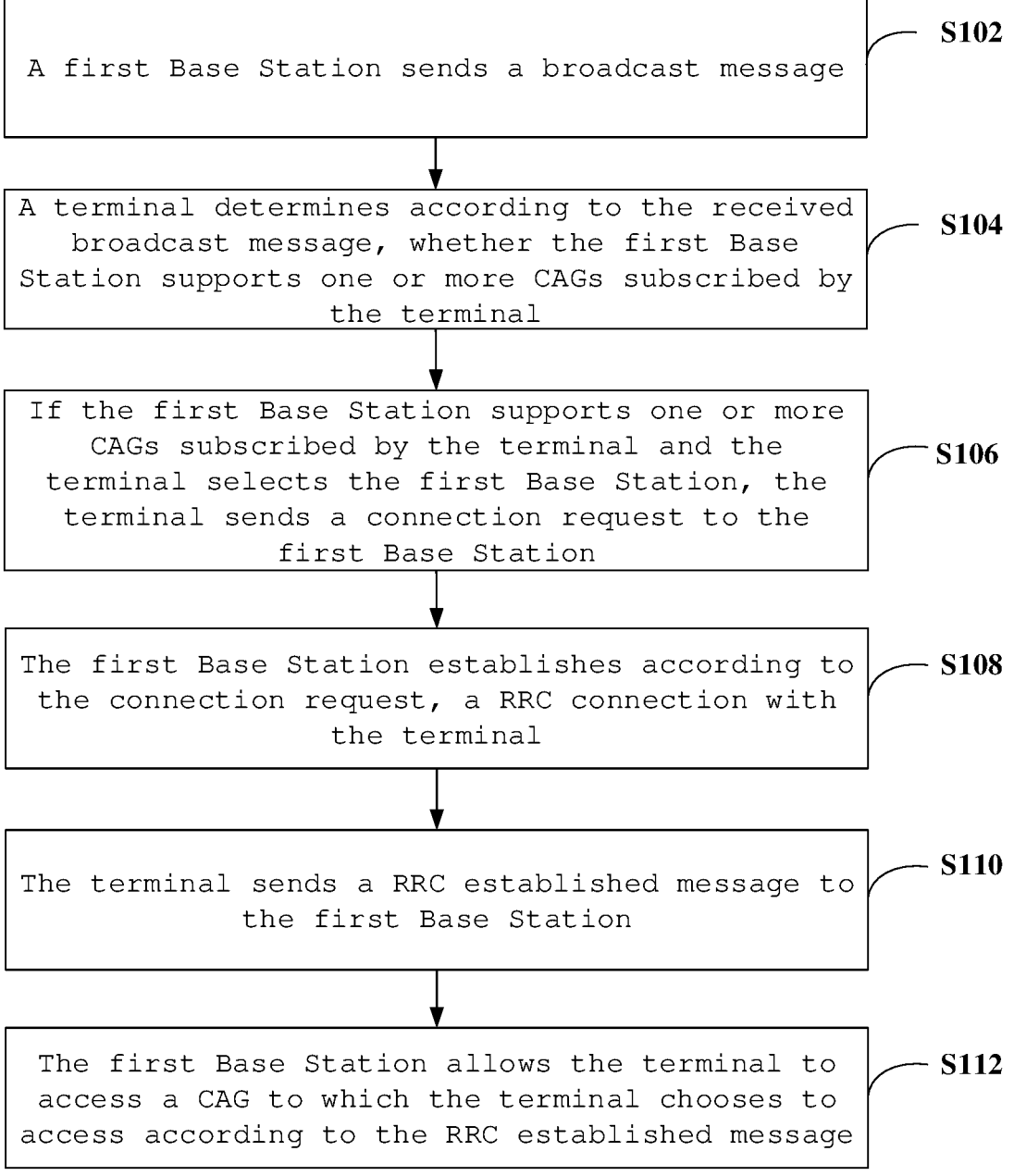

A first Base Station sends a broadcast message — S102

A terminal determines according to the received broadcast message, whether the first Base Station supports one or more CAGs subscribed by the terminal — S104

If the first Base Station supports one or more CAGs subscribed by the terminal and the terminal selects the first Base Station, the terminal sends a connection request to the first Base Station — S106

The first Base Station establishes according to the connection request, a RRC connection with the terminal — S108

The terminal sends a RRC established message to the first Base Station — S110

The first Base Station allows the terminal to access a CAG to which the terminal chooses to access according to the RRC established message — S112

COMMUNICATION METHOD, SYSTEM, BASE STATION, AND TERMINAL

CROSS-REFERENCE TO RELATED APPLICATIONS

The present disclosure is a U.S. National Stage Application under 35 U.S.C. § 371 of International Patent Application No. PCT/CN2020/101569, filed on Jul. 13, 2020, which is based on and claims priority of Chinese application for invention No. 201911042165.4 filed on Oct. 30, 2019, the disclosures of both of which are hereby incorporated into this disclosure by reference in its entirety.

TECHNICAL FIELD

The present disclosure relates to the field of communication technologies, and in particular, to a communication method and system, a base station, and a terminal.

BACKGROUND

The research goal of 5G technology is to provide communication with higher reliability and lower delay, so as to meet requirements of different users in different industries. For example, according to requirements of some specific users in a coverage of a public network, non-public networks dedicated to the specific users can be designed for communication services. Non-standalone (NSA) non-public networks can meet requirements of some specific users in a coverage of a network, a concept of which can be described by Closed Access Group (CAG). A user belonging to a CAG cell can select to access the network via a public network or access the network via the CAG cell according to their own registration information. Through building CAG cells, operators can provide non-public network access for special building scenarios covered by a public network (such as large shopping malls, SOHO, etc.).

At present, a research point of considering that the 5G network will support the function of the NSA non-public networks in the future has been found in the research of NR (New Radio) high-level core network technology. However, there is no solution for CAG service proposed in the current research of wireless side. In order to support the NSA non-public networks in the 5G stage, it is necessary to design a corresponding system process.

SUMMARY

According to some embodiments of the present disclosure, a communication method is provided, comprising: sending, by a first Base Station (BS), a broadcast message, wherein the broadcast message comprising: one or more Closed Access Group identities (CAG IDs) and one or more Public Land Mobile Network Identities (PLMN IDs) supported by the first BS; receiving, by the first BS, a connection request sent from a terminal, wherein the connection request represents that the first BS supports at least one of one or more CAGs subscribed by the terminal; establishing, by the first BS, a Radio Resource Control (RRC) connection with the terminal according to the connection request; receiving, by the first BS, a RRC connection setup complete message sent from the terminal, wherein the RRC connection setup complete message carries a CAG ID and a PLMN ID, which correspond to a CAG cell that the terminal selects to access; and allowing, by the first BS, the terminal to access the CAG cell that the terminal selects to access, according to the RRC connection setup complete message.

In some embodiments, allowing, by the first BS, the terminal to access the CAG cell that the terminal selects to access comprises: sending, by the first BS, an initial user equipment (UE) message to a core network element, wherein the initial UE message comprises the CAG ID and the PLMN ID, which correspond to the CAG cell that the terminal selects to access, which are used for verifying whether a current access of the terminal is legal; and receiving, by the first BS, a downlink non-access stratum transport message sent from the core network element, and allowing the terminal to access the CAG cell that the terminal selects to access according to the downlink non-access stratum transport message, wherein the downlink non-access stratum transport message represents that the current access of the terminal is legal; optionally, wherein an Allowed CAG list of the terminal and an access mode indication of the terminal are added to a mobility restriction list of the downlink non-access stratum transport message, wherein the Allowed CAG list comprises one or more CAG IDs and one or more PLMN IDs subscribed by the terminal, and the access mode indication comprises a CAG-only indication; optionally, wherein whether the current access of the terminal is legal is determined according to a comparison result between the CAG ID and the PLMN ID, which correspond to the CAG cell that the terminal selects to access and the Allowed CAG list of the terminal.

In some embodiments, the method further comprises: receiving, by the first BS, a measurement report sent from the terminal, wherein the measurement report comprises: a CAG ID, a PLMN ID, and signal quality information, which correspond to each of one or more neighborhood cells measured by the terminal; making a handover judgment and determining a cell corresponding to a second BS as a target cell according to the measurement report by the first BS; sending, by the first BS, a handover request to the second BS, in a case of judging that a handover condition is met, wherein the handover request comprises an Allowed CAG list of the terminal, the Allowed CAG list of the terminal comprising one or more CAG IDs and one or more PLMN IDs subscribed by the terminal; receiving, by the first BS, a handover request acknowledge message returned from the second BS; and handing over the terminal to the target cell by the first BS, according to the handover request acknowledge message, wherein the handover request acknowledge message represents that the target cell supports a CAG ID and a PLMN ID subscribed by the terminal.

In some embodiments, the handover request further comprises an access mode indication of the terminal, the access mode indication comprising a CAG-only indication, and the method further comprising: determining, by the second BS, that the terminal can only access a CAG cell according to the access mode indication; determining, by the second BS, whether to allow a handover of the terminal according to a comparison result between one or more CAG IDs and one or more PLMN IDs supported by the second BS and the Allowed CAG list of the terminal, or a comparison result between a CAG ID and a PLMN ID supported by the target cell and the Allowed CAG list of the terminal; and sending, by the second BS, the handover request acknowledge message to the first BS, in a case that the handover of the terminal is allowed.

In some embodiments, making a handover judgment and determining a cell corresponding to a second BS as a target cell according to the measurement report by the first BS, and sending, by the first BS, a handover request to the second BS, in a case of judging that a handover condition is met comprises: making a handover judgment according to a matching result between the CAG ID and the PLMN ID, which correspond to the each of the one or more neighborhood cells measured by the terminal and the Allowed CAG list of the terminal, as well as the signal quality information corresponding to the each of the one or more neighborhood cells measured by the terminal, selecting the cell corresponding to the second BS as the target cell in a case of judging that the handover condition is met, and sending the handover request to the second BS by the first BS, wherein the Allowed CAG list of the terminal is obtained by the first BS through an initial context setup request sent from the core network element.

In some embodiments, the method further comprises: receiving, by the first BS, a measurement report sent from the terminal, wherein the measurement report comprises: a CAG ID, a PLMN ID, and signal quality information, which correspond to each of one or more neighborhood cells measured by the terminal; making a handover judgment and determining a cell corresponding to a third BS as a target cell according to the measurement report by the first BS; sending, by the first BS, a handover required message to a core network element, to initiate a handover request to the third BS through the core network element, wherein the handover required message comprises an identifier of the target cell, in a case where the first BS judges that a handover condition is met; and receiving, by the first BS, a handover command returned by the core network element, and executing a handover process, wherein the handover command represents that the target cell supports a CAG of the one or more CAGs subscribed by the terminal.

In some embodiments, the method further comprises: determining, by the core network element, whether a current handover of the terminal is legal according to a comparison result between one or more CAG IDs and one or more PLMN IDs supported by the third BS and an Allowed CAG list of the terminal or a comparison result between a CAG ID and a PLMN ID supported by the target cell and the Allowed CAG list of the terminal; and sending, by the core network element, the handover request to the third BS, in a case that the current handover of the terminal is legal, wherein the Allowed CAG list comprises the one or more CAG IDs and the one or more PLMN IDs subscribed by the terminal; optionally, wherein the third BS sends the one or more CAG IDs supported by the third BS to the core network element through a Next Generation (NG) setup request or a Radio Access Network (RAN) configuration update message.

In some embodiments, the handover request comprises a mobility restriction list, which comprises an Allowed CAG list of the terminal and an access mode indication of the terminal, wherein the Allowed CAG list comprises the one or more CAG IDs and one or more PLMN IDs subscribed by the terminal, the access mode indication comprises a CAG-only indication, and the method further comprising: determining, by the third BS, that the terminal can only access a CAG cell, according to the access mode indication; determining, by the third BS, whether to allow a handover of the terminal according to a comparison result between one or more CAG IDs and one or more PLMN IDs supported by the third BS and the Allowed CAG list of the terminal or a comparison result between a CAG ID and a PLMN ID supported by the target cell and the Allowed CAG list of the terminal; and sending, by the third BS, a handover request acknowledge message to the core network element in a case that the handover of the terminal is allowed.

According to other embodiments of the present disclosure, a communication method is provided, comprising: receiving, by a terminal, a broadcast message sent from a first Base Station (BS), wherein the broadcast message comprising: one or more Closed Access Group identities (CAG IDs) and one or more Public Land Mobile Network Identities (PLMN IDs) supported by the first BS; determining, by the terminal, whether the first BS supports at least one of one or more CAGs subscribed by the terminal according to the broadcast message; if the first BS supports at least one of the one or more CAGs subscribed by the terminal, selecting, by the terminal, a CAG from the least one of the one or more CAGs subscribed by the terminal and supported by the first BS; sending, by the terminal, a connection request to the first BS, and establishing a Radio Resource Control (RRC) connection with the first BS; and sending, by the terminal, a RRC setup complete message to the first BS, wherein the RRC setup complete message carries a CAG ID and a PLMN ID, which correspond to a CAG cell that the terminal selects to access, to instruct the first BS to connect the terminal to the CAG cell that the terminal selects to access.

In some embodiments, determining, by the terminal, whether the first BS supports least one of one or more CAGs subscribed by the terminal according to the broadcast message comprises: determining, by the terminal, whether the first BS supports least one of the one or more CAGs subscribed by the terminal according to a comparison result between the one or more CAG IDs and the one or more PLMN IDs supported by the first BS and an Allowed CAG list of the terminal, wherein the Allowed CAG list comprises: one or more CAG IDs and one or more PLMN IDs subscribed by the terminal.

In some embodiments, the method further comprises: sending, by the terminal, a measurement report to the first BS, wherein the measurement report comprises: a CAG ID, a PLMN ID, and signal quality information, which correspond to each of one or more neighborhood cells measured by the terminal, which is used for handing over the terminal by the first BS.

According to still other embodiments of the present disclosure, a BS is provided, wherein the BS is a first BS, comprising: a sending module configured to send a broadcast message, wherein the broadcast message comprising: one or more Closed Access Group identities (CAG IDs) and one or more Public Land Mobile Network Identities (PLMN IDs) supported by the first BS; a receiving module configured to receive a connection request sent from a terminal, wherein the connection request represents that the first BS supports at least one of one or more CAGs subscribed by the terminal; and a connecting module configured to establish a Radio Resource Control (RRC) connection with the terminal according to the connection request, receive a RRC connection setup complete message sent from the terminal, and allow the terminal to access the CAG cell that the terminal selects to access, according to the RRC connection setup complete message, wherein the RRC connection setup complete message carries a CAG ID and a PLMN ID, which correspond to a CAG cell that the terminal selects to access.

According to still other embodiments of the present disclosure, a terminal is provided, comprising: a receiving module configured to receive a broadcast message sent from a first Base Station (BS), wherein the broadcast message comprising: one or more Closed Access Group identities (CAG IDs) and one or more Public Land Mobile Network Identities (PLMN IDs) supported by the first BS; a determining module configured to determine whether the first BS supports at least one of one or more CAGs subscribed by the terminal according to the broadcast message; and a sending module configured to, if the first BS supports at least one of the one or more CAGs subscribed by the terminal, select a CAG from the least one of the one or more CAGs subscribed by the terminal and supported by the first BS, send a connection request to the first BS, and establishing a Radio Resource Control (RRC) connection with the first BS, and send a RRC setup complete message to the first BS, wherein the RRC setup complete message carries a CAG ID and a PLMN ID, which correspond to a CAG cell that the terminal selects to access, to instruct the first BS to connect the terminal to the CAG cell that the terminal selects to access.

According to still other embodiments of the present disclosure, a communication system is provided, comprising: a BS according to any of the foregoing embodiments and a terminal according to any of the foregoing embodiments.

In some embodiments, the BS is a first BS, and the system further comprises: a core network element configured to receive an initial user equipment (UE) message sent from the first BS, determine whether a current access of the terminal is legal according to the initial UE message, send a downlink non-access stratum transport message to the first BS, in a case where the current access of the terminal is legal, wherein the initial UE message comprises a CAG ID and a PLMN ID, which correspond to the CAG cell that the terminal selects to access.

In some embodiments, the core network element is configured to determine whether the current access of the terminal is legal according to a comparison result between the CAG ID and the PLMN ID, which correspond to the CAG cell that the terminal selects to access and an Allowed CAG list of the terminal, wherein the Allowed CAG list comprises one or more CAG IDs and one or more PLMN IDs subscribed by the terminal; or the core network element is further configured to receive a handover required message sent from the first BS, send a handover request to a third BS according to the handover required message, receive a handover request acknowledge message sent from the third BS, and return a handover command to the first BS according to the handover request acknowledge message.

In some embodiments, the system further comprises: a second BS configured to receive a handover request sent from the first BS, determine whether to allow a handover of the terminal according to the handover request, return a handover request acknowledge message to the first BS, in a case that the second BS allows the handover of the terminal, wherein the handover request comprises an Allowed CAG list of the terminal, and the Allowed CAG list comprises one or more CAG IDs and one or more PLMN IDs subscribed by the terminal; optionally, wherein the handover request further comprises an access mode indication of the terminal, and the access mode indication comprising a CAG-only indication; and the second BS is configured to determine that the terminal can only access a CAG cell according to the access mode indication, determine whether to allow the handover of the terminal according to a comparison result between one or more CAG IDs and one or more PLMN IDs supported by the second BS and the Allowed CAG list of the terminal, or a comparison result between a CAG ID and a PLMN ID supported by the target cell and the Allowed CAG list of the terminal, and send the handover request acknowledge message to the first BS, in a case that the handover of the terminal is allowed.

In some embodiments, the system further comprise: the third BS, wherein: the core network element is configured to determine whether a current handover of the terminal is legal according to between one or more CAG IDs and one or more PLMN IDs supported by the third BS and an Allowed CAG list of the terminal or a comparison result between a CAG ID and a PLMN ID supported by the target cell and the Allowed CAG list of the terminal, and send a handover request to the third BS, in a case that the current handover of the terminal is legal; or the third BS is configured to receive the handover request from the core network element, wherein the handover request comprises an Allowed CAG list of the terminal and an access mode indication of the terminal, and the access mode indication comprising a CAG-only indication, determine that the terminal can only access a CAG cell according to the access mode indication, determine whether to allow a handover of the terminal according to a comparison result between one or more CAG IDs and one or more PLMN IDs supported by the third BS and the Allowed CAG list of the terminal or a comparison result between a CAG ID and a PLMN ID supported by the target cell and the Allowed CAG list of the terminal, and send a handover request acknowledge message to the core network element, in a case that the handover of the terminal is allowed; optionally, the third BS is configured to send the one or more CAG IDs supported by the third BS to the core network element through a Next Generation (NG) setup request or a Radio Access Network (RAN) configuration update message.

According to still other embodiments of the present disclosure, a BS is provided, comprising: a processor; and a memory coupled to the processor and storing instructions that when executed by the processor, cause the processor to execute the methods performed by the first BS, the second BS and the third BS in the communication method of any one of the foregoing embodiments.

According to still other embodiments of the present disclosure, a terminal is provided, comprising: a processor; and a memory coupled to the processor and storing instructions that when executed by the processor, cause the processor to execute the method performed by the terminal in the communication method of any one of the foregoing embodiments.

Other features and advantages of the present invention will become apparent from the following detailed description of exemplary embodiments of the present disclosure with reference to the accompanying drawings.

BRIEF DESCRIPTION OF THE DRAWINGS

The accompanying drawings, which are comprised to provide a further understanding of the present disclosure and are incorporated in and constitute a part of this specification, illustrate embodiments of the invention, and together with the illustrative embodiments of the present application serve to explain the present disclosure, but are not limitation thereof.

FIG. 1 shows a schematic flowchart of a communication method according to some embodiments of the present disclosure.

DETAILED DESCRIPTION

Figures 2, 3:
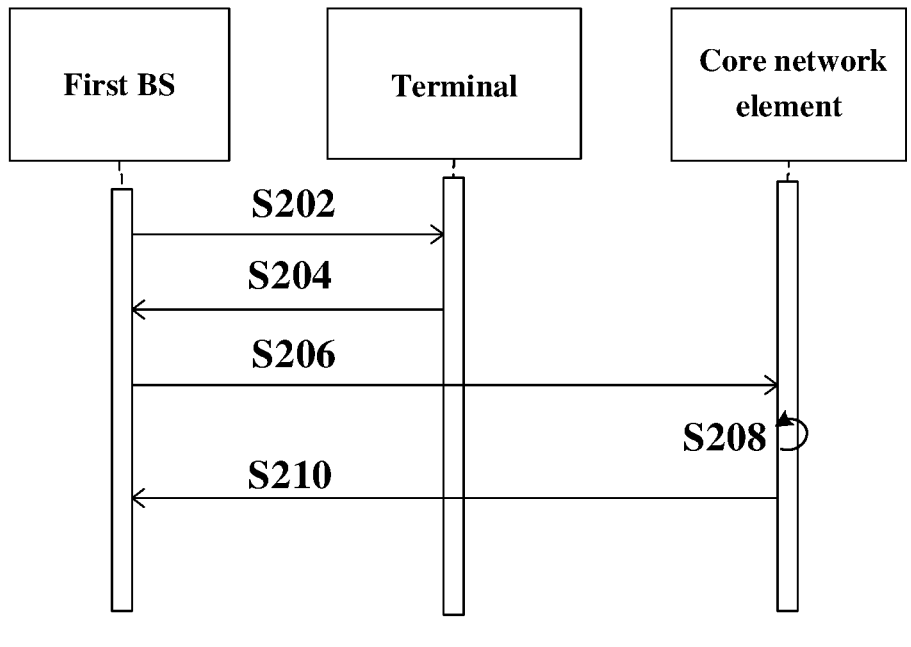
FIG. 2 shows a schematic flowchart of a communication method according to other embodiments of the present disclosure.
FIG. 3 shows a schematic flowchart of a communication method according to still other embodiments of the present disclosure.

Below, a clear and complete description will be given for the technical solution of embodiments of the present disclosure with reference to the figures of the embodiments. Obviously, merely some embodiments of the present disclosure, rather than all embodiments thereof, are given herein. The following description of at least one exemplary embodiment is in fact merely illustrative and is in no way intended as a limitation to the invention, its application or use. All other embodiments obtained by those of ordinary skill in the art based on the embodiments of the present disclosure without creative efforts shall fall within the protection scope of the present disclosure.

A technical problem to be solved by the present disclosure is to provide a solution for providing CAG services for a terminal in a NSA scenario.

In view of the problem that the current standard does not provide a specific solution for how to provide non-public network services for terminals in the 5G NSA scenario, this solution is proposed.

In the present disclosure, a new identifier is added on the terminal side. For example, an access mode indication of a non-standalone (NSA) non-public network is added. The access mode indication comprises: a CAG-only indication. A terminal with this indication can only access a network via CAG. For another example, an Allowed CAG list of a terminal is added, for storing CAG IDs corresponding to one or more CAG networks that the terminal registered and authorized to access. The above access mode indication and Allowed CAG list may be determined when the terminal subscribes and registers, and may be kept by the core network and the terminal, respectively. During an access and a handover process of the terminal, a BS may acquire the above access mode indication and Allowed CAG list through the core network, which will be described in detail later.

A new identifier is also added on the network side, for example, one or more CAG IDs supported by the BS is added, and a CAG network can be uniquely determined through a CAG ID and a Public Land Mobile Network (PLMN) ID.

Some embodiments of a communication method of the present disclosure will be described below with reference to FIG. 1.

FIG. 1 is a flowchart of a communication method according to some embodiments of the present disclosure. As shown in FIG. 1, the method of this embodiment comprises: steps S102 to S112.

In step S102, a first BS sends a broadcast message, and the terminal listens to the broadcast message sent from the first BS correspondingly.

The broadcast message comprises: one or more CAG IDs supported by the first BS. There are one or more CAG IDs supported by the first BS. If there are multiple CAG IDs, a CAG ID list can be formed. For example, the CAG IDs supported by the first BS can be comprised in a SIB (System Information Block), such as in SIB1. The broadcast message may also comprise various information that has been determined in existing standards, for example, one or more PLMN (Public Land Mobile Network) IDs and the like.

In step S104, the terminal determines whether the first BS supports at least one of one or more CAGs subscribed by the terminal according to the broadcast message received.

In some embodiments, the terminal determines a network access mode according to an access mode indication configured. For example, if the access mode indication is a CAG-only indication, it means that the terminal can only access a network via a CAG; if the access mode indication is NULL or a PLMN-only indication, the terminal can only access the network via a PLMN. After receiving the broadcast message, the terminal parses the broadcast message to obtain the one or more CAG IDs supported by the first BS. Whether the first BS supports at least one of the one or more CAGs subscribed by the terminal is determined according to a comparison result between the one or more CAG ID and the one or more PLMN IDs supported by the first BS and an Allowed CAG list of the terminal. The Allowed CAG list comprises: one or more CAG IDs and one or more PLMN IDs subscribed by the terminal. The one or more CAG IDs can be divided into at least one group, and each of the one or more PLMN IDs corresponds to one group.

In step S106, if the first BS supports at least one of the one or more CAGs subscribed by the terminal and the terminal selects the first BS, the terminal sends a connection request to the first BS. Correspondingly, the first BS receives the connection request sent from the terminal.

In addition to the first BS, there may be one or more BSs supporting at least one of the one or more CAGs subscribed by the terminal, and the above process can be used as an improvement to an existing cell selection or cell reselection process. That is, if the terminal is currently in a cell selection scenario, the first BS or other BS is selected according to a rule in the cell selection process, or if the terminal is currently in a cell reselection scenario, the first BS or other BS is selected according to a rule in the cell reselection process.

The following improvements are made to the existing cell selection and the cell reselection process, and a reference can be made to the existing standards for the unchanged contents. The terminal determines a network access mode according to whether the terminal is configured with the CAG-only indication. For a terminal is configured with a CAG-only indication, the terminal periodically listens to one or more CAG IDs in broadcast messages, and judges whether itself is a CAG subscription terminal corresponding to at least one of the one or more CAG IDs in the broadcast message based on the Allowed CAG list. If so, a cell corresponding to one of the one or more CAG IDs in the broadcast message is selected to access according to the cell selection or cell reselection rules.

The terminal sends a connection request such as a RRC Setup Request (Radio Resource Control Setup Request) to the first BS. For this information, a reference can be made to the existing techniques.

The first BS can allow the terminal to access a CAG cell that the terminal selects to access according to the connection request as described below.

In step S108, the first BS establishes a RRC connection with the terminal according to the connection request.

In step S110, the terminal sends a RRC setup complete message to the first BS, and the first BS receives the RRC setup complete message sent from the terminal. The RRC setup complete message can carry the CAG ID and the PLMN ID, which correspond to a CAG cell that the terminal selects to access.

In step S112, the first BS allows the terminal to access the CAG cell that the terminal selects to access according to the RRC setup complete message.

In some embodiments, as shown in FIG. 2, the process of establishing a RRC connection between the BS and the terminal, and allowing the terminal to access a CAG cell that the terminal selects to access comprises: steps S202 to S210.

In step S202, the first BS sends a radio resource control setup message, such as RRC Setup (Radio Resource Control Setup), to the terminal. For this step, a reference can be made to the existing techniques. For example, the first BS may determine whether to allow the terminal to access according to information such as a load situation; and if allowed, step S204 is performed.

In step S204, the terminal sends the radio resource control setup complete message, for example, RRC Setup Complete (Radio Resource Control Setup Complete), to the first BS. For this step, a reference can be made to the existing techniques.

The radio resource control setup complete message may comprise: the CAG ID and the PLMN ID, which correspond to the CAG cell that the terminal selects to access. In a case where the first BS supports multiple CAGs, the terminal will select a CAG that matches the Allowed CAG list of the terminal to access.

In step S206, the first BS sends an initial user equipment (UE) message to the core network element.

The initial UE message is, for example, INITIAL UE MESSAGE, and comprises: the CAG ID and the PLMN ID, which correspond to the CAG cell that the terminal selects to access. In this step, the CAG ID, which correspond to the CAG cell that the terminal selects to access is added to the existing signaling.

In step S208, the core network element determines whether a current access of the terminal is legal according to the initial UE message.

The core network element is, for example, an AMF (Access and Mobility Management Function). In some embodiments, the core network element determines whether the current access of the terminal is legal according to a comparison result between the CAG ID and the PLMN ID, which correspond to the CAG cell that the terminal selects to access and the Allowed CAG list of the terminal. If the CAG ID and PLMN ID, which correspond to the CAG cell that the terminal selects to access are identical to any CAG ID in the Allowed CAG list of the terminal and its corresponding PLMN ID, it is determined that the current access of the terminal is legal; otherwise, this access is illegal. The core network element authenticates the terminal through the above process.

In step S210, the core network element sends a downlink non-access stratum transport message to the first BS, in a case that the current access of the terminal is legal. Correspondingly, the first BS receives the downlink non-access stratum transport message sent from the core network element. The downlink non-access stratum transport message indicates that the current access of the terminal is legal, and the first BS may connect the terminal to the CAG cell that the terminal selects to access according to the downlink non-access stratum transport message.

The downlink non-access stratum transport message is, for example, DOWNLINK NAS TRANSPORT. The Allowed CAG list of the terminal and the access mode indication of the terminal are added to a Mobility Restriction List of the DOWNLINK NAS TRANSPORT message, wherein the Allowed CAG list comprises the one or more CAG IDs and the one or more PLMN IDs subscribed by the terminal, and the access mode indication comprises: the CAG-only indication.

For this DOWNLINK NAS TRANSPORT message, a reference can be made to the existing techniques. In the above embodiment, in a process of an initial access of the terminal, the CAG ID of the CAG cell that the terminal selects to access is added to the INITIAL UE MESSAGE, and the authentication process of the terminal that is performed by the core network element is added.

In the method of the above embodiment, the first BS broadcasts the one or more CAG IDs and the one or more PLMN IDs supported by the first BS through the broadcast message, and the terminal selects the first BS for initial access according the to one or more CAGs subscribed by the terminal and the broadcast message listened by the terminal, thereby accessing a corresponding CAG cell. The method of the above embodiment provides a solution for the terminal to access a non-public network in the NSA scenario, so as to provide services for the terminal using the non-public network by improving the existing signaling process.

The present disclosure further provides a process for realizing a terminal handover between CAG cells. In the NSA scenario, a handover can be a Xn-based handover or a NG-based (Next Generation) handover, which will be described below with reference to FIG. 3 and FIG. 4, respectively.

FIG. 3 is a flowchart of a communication method according to other embodiments of the present disclosure. As shown in FIG. 3, the method of this embodiment comprises: steps S302 to S308.

In step S302, the terminal sends a measurement report to the first BS, and correspondingly, the first BS receives the measurement report sent from the terminal.

The measurement report comprises: a CAG ID, a PLMN ID, and signal quality information, which correspond to each of one or more neighborhood cells measured by the terminal, and other information, for which a reference can be made to the existing techniques. The CAG ID corresponding to the each of the one or more neighborhood cells measured by the terminal can be added to the measurement report.

In step S304, the first BS makes a handover judgment according to the measurement report; selects a cell corresponding to a second BS as a target cell and sends a handover request to the second BS, in a case of judging that a handover condition is met. For the details of making a handover judgment by the first BS and determining the cell corresponding to the second BS as the target cell, a reference can be made to the existing techniques, which will not be repeated herein.

In the above embodiment, after the core network element sends the downlink non-access stratum transport message to the first BS, the signaling process further comprises: sending, by the core network element, an initial context setup request, e.g., INITIAL CONTEXT SETUP REQUEST, to the first BS, wherein the Allowed CAG list of the terminal is added to this message. The Allowed CAG list subscribed by the terminal can be obtained at the core network element, and notified to the first BS through the above message.

In some embodiments, the first BS makes the handover judgment according to a matching result between the CAG ID and the PLMN ID, which correspond to the each of the one or more neighborhood cells measured by the terminal and the Allowed CAG list of the terminal, as well as the signal quality information corresponding to the each of the one or more neighborhood cells measured by the terminal; selects the cell corresponding to the second BS as the target cell in a case of judging that the handover condition is met; and sends the handover request to the second BS. One or more CAG IDs and one or more PLMN IDs supported by the second BS must have an intersection with the one or more CAG IDs and the one or more PLMN IDs subscribed by the terminal. Other information that needs to be considered for the selection of the second BS, such as signal quality information, can be determined according to existing techniques.

The Allowed CAG list of the terminal can be added to the handover request, for example, Handover Request. Further, the access mode indication of the terminal can also be added to the handover request. The access mode indication comprises: the CAG-only indication. The Allowed CAG list of the terminal and the CAG-only indication can be added to the Mobility Restriction List IE.

In step S306, the second BS determines whether to allow a handover of the terminal according to the handover request.

The second BS determines that the terminal can only access a CAG cell according to the access mode indication, and determines whether to allow the handover of the terminal according to a comparison result between the one or more CAG IDs and the one or more PLMN IDs supported by the second BS and the Allowed CAG list of the terminal. In a case that the one or more CAG IDs and the one or more PLMN IDs supported by the second BS have an intersection with the Allowed CAG list of the terminal, the second BS determines that the handover of the terminal is allowed. Alternatively, the second BS determines whether to allow the handover of the terminal according to a comparison result between a CAG ID and a PLMN ID supported by the target cell and the Allowed CAG list of the terminal. The second BS can control the handover of the terminal through an authentication of the terminal.

In step S308, the second BS sends a handover request acknowledge message to the first BS, in a case that the handover of the terminal is allowed. Correspondingly, the first BS receives the handover request acknowledge message sent from the second BS, and hands over the terminal to the target cell.

For example, the second BS returns a Handover Request Ack (handover request acknowledge) to the first BS. For a subsequent handover process, a reference can be made to the existing techniques.

In the above Xn-based handover embodiment, the source BS (the first BS) can control the selection of the target BS (the second BS) or the target cell according to the measurement report of the terminal. For example, the first BS does not to hand over the terminal with a CAG-only indication to a non-CAG cell, and so on. The target BS can authenticate the terminal to determine whether to allow an access of the terminal. A process of handing over the terminal between CAG cells can be realized by adding the CAG ID corresponding to the each of the one or more neighborhood cells measured by the terminal, the Allowed CAG list and the CAG-only indication in the existing handover signaling.

A NG-based handover process will be described below with reference to FIG. 4.

Figure 4:
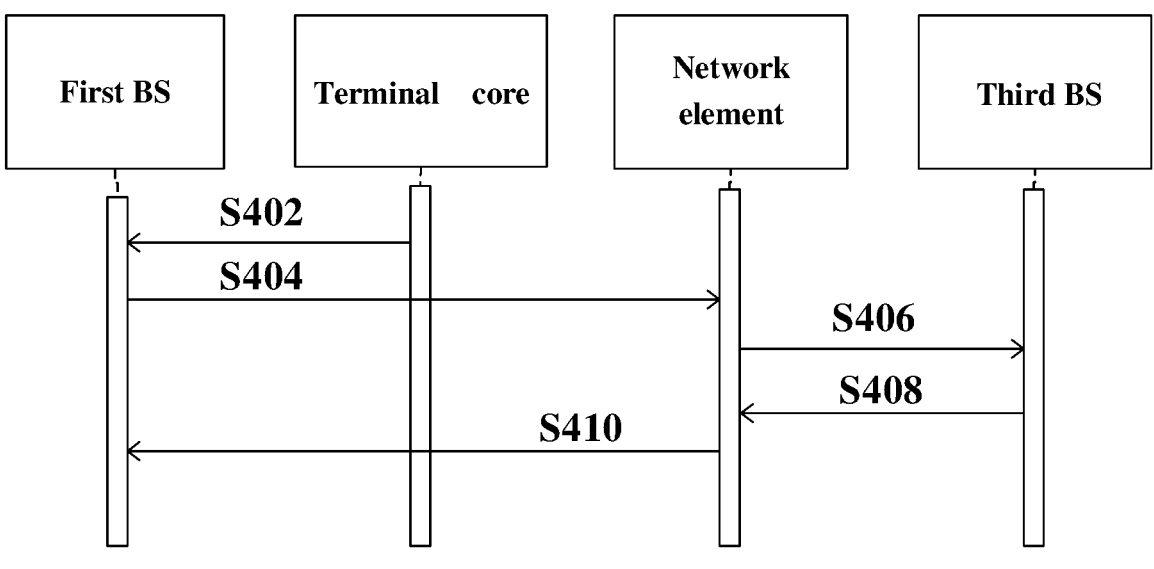
FIG. 4 shows a schematic flowchart of a communication method according to still other embodiments of the present disclosure.

FIG. 4 is a flowchart of a communication method according to other embodiments of the present disclosure. As shown in FIG. 4, the method of this embodiment comprises: steps S402 to S410.

In step S402, the terminal sends a measurement report to the first BS, and correspondingly, the first BS receives the measurement report sent from the terminal.

The measurement report comprises: a CAG ID, a PLMN ID and signal quality information, which correspond to each of one or more neighborhood cells measured by the terminal, and other information, for which a reference can be made to the existing techniques. the CAG ID corresponding to each of one or more neighborhood cells measured by the terminal can be added to the measurement report. Since the terminal cannot know whether a subsequent handover process is based on a Xn-based or NG-based process, information of the measurement report is consistent with the foregoing embodiment.

In step S404, the first BS makes a handover judgment according to the measurement report; selects a cell of a third BS as a target cell, in the case that the handover condition is met, and sends a handover required message to a core network element.

The core network element is, for example, the AMF. The handover required message is, for example, Handover Required, and comprises: an ID of the third BS.

In step S406, the core network element sends a handover request to the third BS according to the handover required message.

In some embodiments, the core network element determines whether a current handover of the terminal is legal according to a comparison result between one or more CAG IDs and one or more PLMN IDs supported by the third BS and an Allowed CAG list of the terminal; or determines whether the current handover of the terminal is legal according to a comparison result between a CAG ID and a PLMN ID supported by the target cell and the Allowed CAG list of the terminal; and sends sending, by the core network element, the handover request to the third BS, in a case that the current handover of the terminal is legal. In a case that the one or more CAG IDs and the one or more PLMN IDs supported by the third BS have an intersection with the Allowed CAG list of the terminal or the CAG ID and the PLMN ID supported by the target cell have an intersection with the Allowed CAG list of the terminal, the core network element determines that the current handover of the terminal is legal. The core network controls the handover of the terminal through the authentication of the terminal.

In some embodiments, a BS (for example, the third BS) sends one or more CAG IDs supported by the BS to the core network element through a NG setup request (for example, NG SETUP REQEST). The core network element may return a NG setup response to the BS (NG SETUP RESPONSE). Alternatively, the BS sends the one or more CAG IDs supported by the BS to the core network element through a RAN configuration update message (for example, RAN CONFIGURATION UPDATE). The core network element may return a RAN configuration update acknowledgment message (for example, RAN CONFIGURATION UPDATE) to the BS. The BS sends a CAG ID list supported by itself to the core network, so that the core network can control the handover of the terminal.

The Allowed CAG list of the terminal can be added to the handover request, for example, Handover Request. Further, the access mode indication of the terminal can also be added to the handover request. The access mode indication comprises: the CAG-only indication. The Allowed CAG list of the terminal and the CAG-only indication can be added to the Mobility Restriction List IE.

In step S408, the third BS sends the handover request acknowledge message to the core network element, and correspondingly, the core network element receives the handover request acknowledge message sent from the third BS.

In some embodiments, the third BS determines that the terminal can only access a CAG cell according to the access mode indication, and determines whether to allow a handover of the terminal according to a comparison result between one or more CAG IDs and one or more PLMN IDs supported by the third BS and the Allowed CAG list of the terminal. In the case that the one or more CAG IDs and the one or more PLMN IDs supported by the third BS have an intersection with the Allowed CAG list of the terminal, the third BS determines that the handover of the terminal is allowed. Alternatively, the third BS determines whether to allow the handover of the terminal according to a comparison result between a CAG ID and a PLMN ID supported by a target cell and the Allowed CAG list of the terminal. The third BS can control the handover of the terminal through an authentication of the terminal.

In step S410, the core network element returns a handover command to the first BS according to the handover request acknowledge message; correspondingly, the first BS receives the handover command returned by the core network element according to the handover request acknowledge message, so as to hand over the terminal to a CAG cell supported by the third BS.

The handover command is, for example, a Handover Command, and a reference can be made to the existing techniques for a subsequent handover process.

In the above NG-based handover embodiment, the source BS (the first BS) sends the handover required message to the core network; the core network can control a selection of a target BS (the second BS) or the target cell according to the measurement report of the terminal. For example, the core network element does not allow to hand over the terminal with the CAG-only indication to a non-CAG cell, or selects the target BS or target cell matching the Allowed CAG list of the terminal, and so on. The target BS can determine whether to allow the terminal to access through the authentication of the terminal. Through adding the CAG ID of the CAG corresponding to the each of the one or more neighborhood cell measured by the terminal, the Allowed CAG list and the CAG-only indication in the existing handover signaling, a process of handing over the terminal between CAG cells can be realized.

The present disclosure further provides a BS, which will be described below with reference to FIG. 5.

Figure 5:
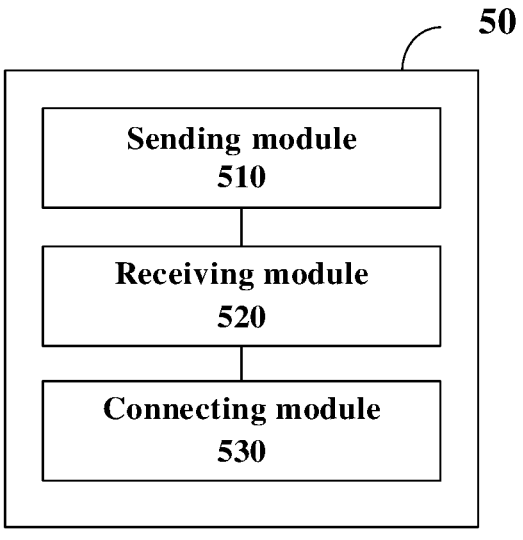
FIG. 5 shows a schematic structural diagram of a BS according to some embodiments of the present disclosure.

FIG. 5 is a structural diagram of a BS according to some embodiments of the present disclosure. As shown in FIG. 5, the BS 50 of this embodiment comprises a sending module 510, a receiving module 520 and a connecting module 530. The BS 50 is configured as the first BS in the foregoing embodiment.

The sending module 510 is configured to send a broadcast message, wherein the broadcast message comprising: one or more Closed Access Group identities (CAG IDs) and one or more Public Land Mobile Network Identities (PLMN IDs) supported by the first BS.

The receiving module 520 is configured to receive a connection request sent from a terminal, wherein the connection request represents that the first BS supports at least one of one or more CAGs subscribed by the terminal.

In some embodiments, the terminal determines whether the first BS supports least one of the one or more CAGs subscribed by the terminal according to a comparison result between the one or more CAG IDs and the one or more PLMN IDs supported by the first BS and an Allowed CAG list of the terminal, wherein the Allowed CAG list comprises: one or more CAG IDs and one or more PLMN IDs subscribed by the terminal.

The connecting module 530 is configured to establish a Radio Resource Control (RRC) connection with the terminal according to the connection request, receive a RRC connection setup complete message sent from the terminal, and allow the terminal to access the CAG cell that the terminal selects to access, according to the RRC connection setup complete message, wherein the RRC connection setup complete message carries a CAG ID and a PLMN ID, which correspond to a CAG cell that the terminal selects to access.

In some embodiments, the sending module 510 is further configured to send an initial user equipment (UE) message to a core network element, wherein the initial UE message comprises the CAG ID and the PLMN ID, which correspond to the CAG cell that the terminal selects to access, which are used for verifying whether a current access of the terminal is legal. The receiving module 520 is further configured to receive a downlink non-access stratum transport message sent from the core network element, and allowing the terminal to access the CAG cell that the terminal selects to access according to the downlink non-access stratum transport message, wherein the downlink non-access stratum transport message represents that the current access of the terminal is legal.

In some embodiments, whether the current access of the terminal is legal is determined according to a comparison result between the CAG ID and the PLMN ID, which correspond to the CAG cell that the terminal selects to access and the Allowed CAG list of the terminal.

In some embodiments, the receiving module 520 is further configured to receive a measurement report sent from the terminal, wherein the measurement report comprises: a CAG ID, a PLMN ID, and signal quality information, which correspond to each of one or more neighborhood cells measured by the terminal. The sending module 510 is further configured to make a handover judgment and determine a cell corresponding to a second BS as a target cell according to the measurement report by the first BS, and send a handover request to the second BS, in a case of judging that a handover condition is met, wherein the handover request comprises an Allowed CAG list of the terminal, the Allowed CAG list of the terminal comprising one or more CAG IDs and one or more PLMN IDs subscribed by the terminal. The receiving module 520 is further configured to receive a handover request acknowledge message returned from the second BS, and hand over the terminal to the target cell by the first BS, according to the handover request acknowledge message, wherein the handover request acknowledge message represents that the target cell supports a CAG ID and a PLMN ID subscribed by the terminal.

In some embodiments, the handover request further comprises an access mode indication of the terminal, the access mode indication comprising a CAG-only indication. The second BS determines, that the terminal can only access a CAG cell according to the access mode indication, determines whether to allow a handover of the terminal according to a comparison result between one or more CAG IDs and one or more PLMN IDs supported by the second BS and the Allowed CAG list of the terminal, or a comparison result between a CAG ID and a PLMN ID supported by the target cell and the Allowed CAG list of the terminal; and sends the handover request acknowledge message to the first BS, in a case that the handover of the terminal is allowed.

In some embodiments, the sending module 510 is further configured to make a handover judgment according to a matching result between the CAG ID and the PLMN ID, which correspond to the each of the one or more neighborhood cells measured by the terminal and the Allowed CAG list of the terminal, as well as the signal quality information corresponding to the each of the one or more neighborhood cells measured by the terminal, select the cell corresponding to the second BS as the target cell in a case of judging that the handover condition is met, and send the handover request to the second BS by the first BS. The Allowed CAG list of the terminal is obtained by the first BS through an initial context setup request sent from the core network element, and comprises the one or more CAG IDs and the one or more PLMN IDs subscribed by the terminal.

In some embodiments, the receiving module 520 is further configured to receive a measurement report sent from the terminal, wherein the measurement report comprises: a CAG ID, a PLMN ID, and signal quality information, which correspond to each of one or more neighborhood cells measured by the terminal. The sending module 510 is further configured to make a handover judgment and determining a cell corresponding to a third BS as a target cell according to the measurement report by the first BS, and send a handover required message to a core network element, to initiate a handover request to the third BS through the core network element, in a case where the first BS judges that a handover condition is met, wherein the handover required message comprises an Allowed CAG list of the terminal and an identifier of the target cell, the Allowed CAG list comprises the one or more CAG IDs and the one or more PLMN IDs subscribed by the terminal. The receiving module 520 is further configured to receive a handover command returned by the core network element, and executing a handover process, wherein the handover command represents that the target cell supports a CAG of the one or more CAGs subscribed by the terminal.

In some embodiments, the core network element determines whether a current handover of the terminal is legal according to a comparison result between one or more CAG IDs and one or more PLMN IDs supported by the third BS and an Allowed CAG list of the terminal or a comparison result between a CAG ID and a PLMN ID supported by the target cell and the Allowed CAG list of the terminal; and sends the handover request to the third BS, in a case that the current handover of the terminal is legal, wherein the Allowed CAG list comprises the one or more CAG IDs and the one or more PLMN IDs subscribed by the terminal.

In some embodiments, the handover request further comprises: an access mode indication of the terminal, and the access mode indication comprising: a CAG-only indication; the third BS determines that the terminal can only access a CAG cell, according to the access mode indication, determines whether to allow a handover of the terminal according to a comparison result between one or more CAG IDs and one or more PLMN IDs supported by the third BS and the Allowed CAG list of the terminal or a comparison result between a CAG ID and a PLMN ID supported by the target cell and the Allowed CAG list of the terminal, and sends a handover request acknowledge message to the core network element in a case that the handover of the terminal is allowed.

In some embodiments, the third BS sends the one or more CAG IDs supported by the third BS to the core network element through a Next Generation (NG) setup request or a Radio Access Network (RAN) configuration update message.

The present disclosure further provides a terminal, which will be described below with reference to FIG. 6.

Figure 6:
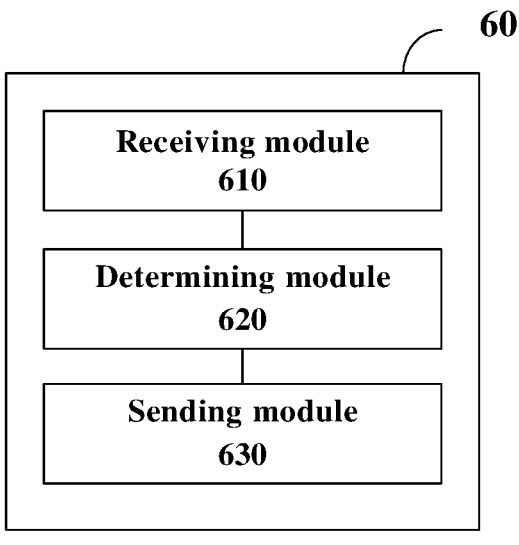
FIG. 6 shows a schematic structural diagram of a terminal according to some embodiments of the present disclosure.

FIG. 6 is a structural diagram of a terminal according to some embodiments of the present disclosure. As shown in FIG. 6, the terminal 60 of this embodiment comprises: a receiving module 610, a determining module 620, and a sending module 630.

The receiving module 610 is configured to receive a broadcast message sent from a first Base Station (BS), wherein the broadcast message comprising: one or more Closed Access Group identities (CAG IDs) and one or more Public Land Mobile Network Identities (PLMN IDs) supported by the first BS.

The determining module 620 is configured to determine by the terminal, whether the first BS supports at least one of one or more CAGs subscribed by the terminal according to the broadcast message.

In some embodiments, the determining module 620 is configured to determine whether the first BS supports least one of the one or more CAGs subscribed by the terminal according to a comparison result between the one or more CAG IDs and the one or more PLMN IDs supported by the first BS and an Allowed CAG list of the terminal, wherein the Allowed CAG list comprises: one or more CAG IDs and one or more PLMN IDs subscribed by the terminal.

The sending module 630 is configured to, if the first BS supports at least one of the one or more CAGs subscribed by the terminal, select a CAG from the least one of the one or more CAGs subscribed by the terminal and supported by the first BS, send a connection request to the first BS, and establishing a Radio Resource Control (RRC) connection with the first BS; and, send a RRC setup complete message to the first BS, wherein the RRC setup complete message carries a CAG ID and a PLMN ID, which correspond to a CAG cell that the terminal selects to access, to instruct the first BS to connect the terminal to the CAG cell that the terminal selects to access.

In some embodiments, the sending module 630 is further configured to send a measurement report to the first BS, wherein the measurement report comprises: a CAG ID, a PLMN ID, and signal quality information, which correspond to each of one or more neighborhood cells measured by the terminal, which is used for handing over the terminal by the first BS.

The present disclosure further provides a communication system, which will be described below with reference to FIG. 7.

Figure 7:
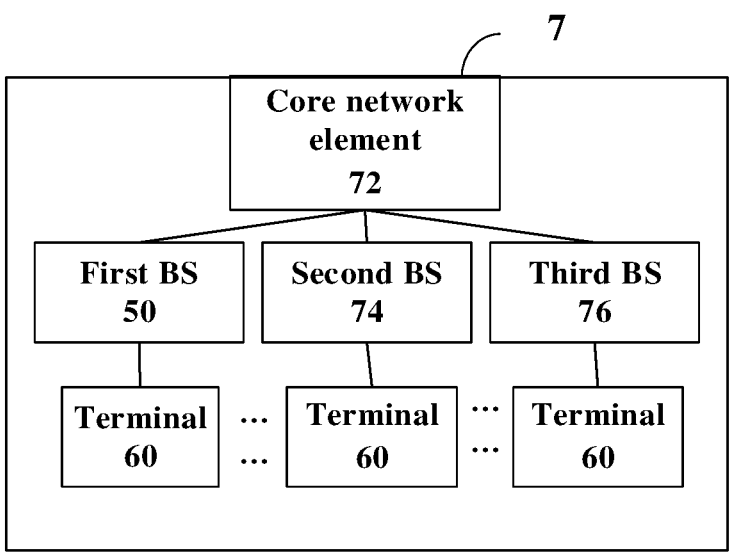
FIG. 7 shows a structural diagram of a communication system according to some embodiments of the present disclosure.

FIG. 7 is a structural diagram of a communication system according to some embodiments of the present disclosure. As shown in FIG. 7, the system 7 of this embodiment comprises: a BS 50 according to any of the foregoing embodiments and a terminal 60 according to any of the foregoing embodiments. The BS 50 may be used as the first BS.

In some embodiments, the system 7 further comprises: a core network element 72 configured to receive an initial user equipment (UE) message sent from the first BS 50, determine whether a current access of the terminal 60 is legal according to the initial UE message, send a downlink non-access stratum transport message to the first BS, in a case where the current access of the terminal 60 is legal, wherein the initial UE message comprises a CAG ID and a PLMN ID, which correspond to the CAG cell that the terminal selects to access.

In some embodiments, the core network element 72 is configured to determine whether the current access of the terminal 60 is legal according to a comparison result between the CAG ID and the PLMN ID, which correspond to the CAG cell that the terminal 60 selects to access and an Allowed CAG list of the terminal 60, wherein the Allowed CAG list comprises one or more CAG IDs and one or more PLMN IDs subscribed by the terminal 60.

In some embodiments, the system 7 further comprises: a second BS 74 configured to receive a handover request sent from the first BS 50, determine whether to allow a handover of the terminal 60 according to the handover request, return a handover request acknowledge message to the first BS 50, in a case that the second BS 74 allows the handover of the terminal 60, wherein the handover request comprises an Allowed CAG list of the terminal 60, and the Allowed CAG list comprises one or more CAG IDs and one or more PLMN IDs subscribed by the terminal 60.

In some embodiments, the handover request further comprises an access mode indication of the terminal 60, and the access mode indication comprising a CAG-only indication, and the second BS 74 is configured to determine that the terminal 60 can only access a CAG cell according to the access mode indication, determine whether to allow the handover of the terminal 60 according to a comparison result between one or more CAG IDs and one or more PLMN IDs supported by the second BS 74 and the Allowed CAG list of the terminal 60, or a comparison result between a CAG ID and a PLMN ID supported by the target cell and the Allowed CAG list of the terminal 60, and send the handover request acknowledge message to the first BS 50, in a case that the handover of the terminal 60 is allowed.

In some embodiments, the system 7 further comprises: a third BS 76. The core network element 72 is further configured to receive a handover required message sent from the first BS 50, send a handover request to a third BS according to the handover required message, receive a handover request acknowledge message sent from the third BS 76, and return a handover command to the first BS 50 according to the handover request acknowledge message.

In some embodiments, the core network element 72 is configured to determine whether a current handover of the terminal 60 is legal according to between one or more CAG IDs and one or more PLMN IDs supported by the third BS 76 and an Allowed CAG list of the terminal or a comparison result between a CAG ID and a PLMN ID supported by the target cell and the Allowed CAG list of the terminal, and send a handover request to the third BS 76, in a case that the current handover of the terminal 60 is legal.

In some embodiments, the third BS 76 is configured to receive a handover request from the core network element 72, wherein the handover request comprises an Allowed CAG list of the terminal and an access mode indication of the terminal 60, and the access mode indication comprising a CAG-only indication; determine that the terminal 60 can only access a CAG cell according to the access mode indication, determine whether to allow a handover of the terminal 60 according to a comparison result between one or more CAG IDs and one or more PLMN IDs supported by the third BS 76 and the Allowed CAG list of the terminal 60 or a comparison result between a CAG ID and a PLMN ID supported by the target cell and the Allowed CAG list of the terminal 60, and send a handover request acknowledge message to the core network element 72, in a case that the handover of the terminal 60 is allowed.

In some embodiments, the third BS 76 is configured to send the one or more CAG IDs supported by the third BS 76 to the core network element 72 through a Next Generation (NG) setup request or a Radio Access Network (RAN) configuration update message.

The communication system of this embodiment of the present disclosure, as well as the BS and terminal, may be implemented by various computing devices or computer systems, which will be described below with reference to FIGS. 8 and 9.

Figure 8:
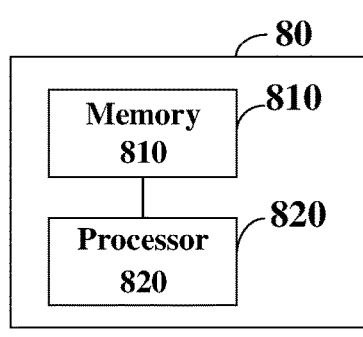
FIG. 8 shows a structural diagram of a communication system according to other embodiments of the present disclosure.

FIG. 8 is a structural diagram of a communication system according to some embodiments of the present disclosure. As shown in FIG. 8, the system 80 of this embodiment comprises: a memory 810 and a processor 820 coupled to the memory 810, the processor 820 configured to, based on instructions stored in the memory 810, carry out the communication method according to any one of the embodiments of the present disclosure.

Wherein, the memory 810 may comprise, for example, system memory, a fixed non-volatile storage medium, or the like. The system memory stores, for example, an operating system, applications, a boot loader, a database, and other programs.

Figure 9:
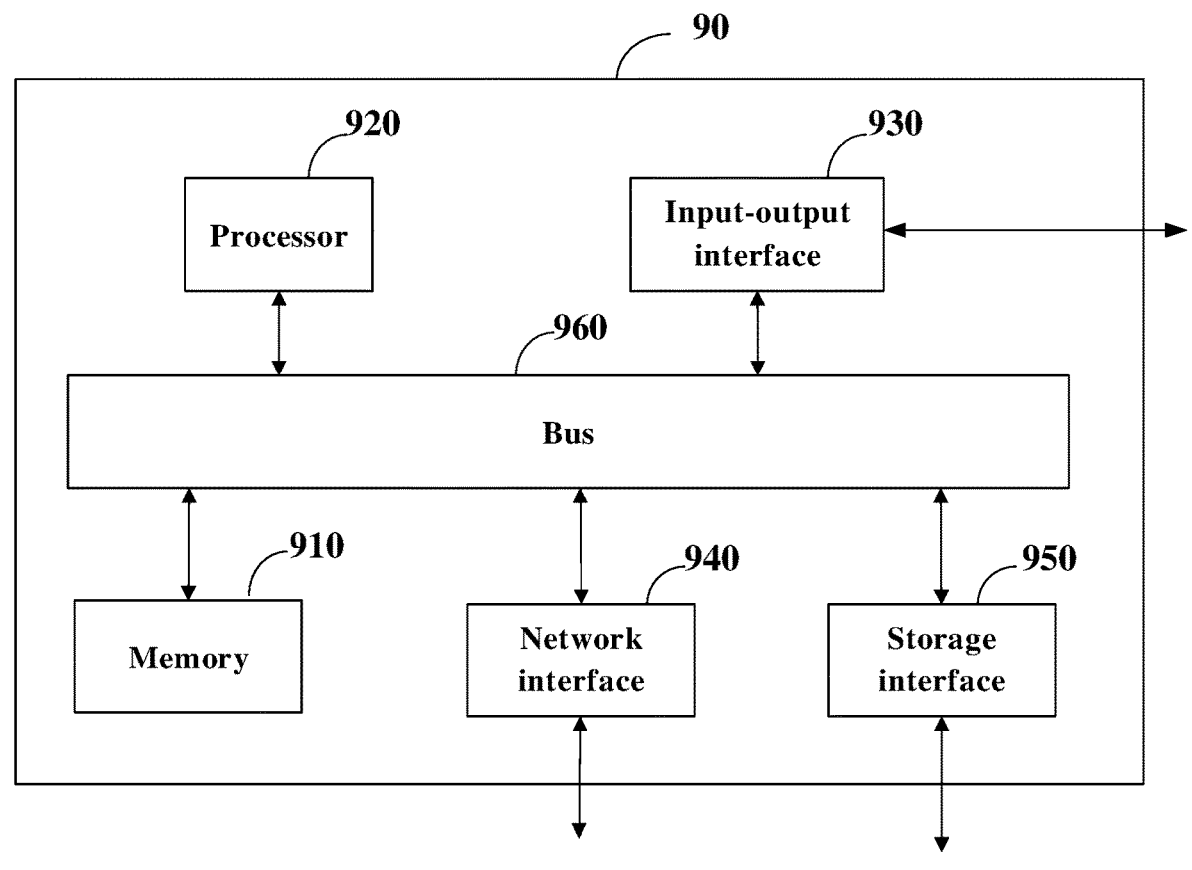
FIG. 9 shows a structural diagram of a communication system according to still other embodiments of the present disclosure.

FIG. 9 is a structural diagram of a communication system according to other embodiments of the present disclosure. As shown in FIG. 9, the system 90 of this embodiment comprises: memory 910 and a processor 920 that are similar to the memory 810 and the processor 820, respectively. It may further comprise an input-output interface 930, a network interface 940, a storage interface 950, and the like. These interfaces 930, 940, 950 and the memory 910 and the processor 920 may be connected to each other through a bus 960, for example. Wherein, the input-output interface 930 provides a connection interface for input-output devices such as a display, a mouse, a keyboard, and a touch screen. The network interface 940 provides a connection interface for various networked devices, for example, it can be connected to a database server or a cloud storage server. The storage interface 950 provides a connection interface for external storage devices such as an SD card and a USB flash disk.

The specific structures for implementing the BS and terminal by computing devices or computer systems are similar to that shown in FIGS. 7 and 8, which will not be repeated herein.

According to still other embodiments of the present disclosure, there is provided a non-transitory computer-readable storage medium storing computer programs, when executed by a processor, cause the processor to implement the communication method of any one of the foregoing embodiments.

According to still other embodiments of the present disclosure, there is provided a non-transitory computer-readable storage medium storing computer programs, when executed by a processor, cause the processor to implement the methods performed by the first BS, the second BS and the third BS in the communication method of any one of the foregoing embodiments.

According to still other embodiments of the present disclosure, there is provided a non-transitory computer-readable storage medium storing computer programs, when executed by a processor, cause the processor to implement the method performed by the terminal in the communication method of any one of the foregoing embodiments.

Those skilled in the art should understand that the embodiments of the present disclosure may be provided as a method, a system, or a computer program product. Therefore, embodiments of the present disclosure can take the form of an entirely hardware embodiment, an entirely software embodiment or an embodiment containing both hard-ware and software elements. Moreover, the present disclo-sure may take the form of a computer program product embodied on one or more computer-usable non-transitory storage media (comprising but not limited to disk storage, CD-ROM, optical memory, etc.) having computer-usable program code embodied therein.

The present disclosure is described with reference to flowcharts and/or block diagrams of methods, apparatuses (systems) and computer program products according to embodiments of the present disclosure. It should be under-stood that each process and/or block in the flowcharts and/or block diagrams, and combinations of the processes and/or blocks in the flowcharts and/or block diagrams may be implemented by computer program instructions. The com-puter program instructions may be provided to a processor of a general purpose computer, a special purpose computer, an embedded processor, or other programmable data pro-cessing device to generate a machine such that the instruc-tions executed by a processor of a computer or other programmable data processing device to generate means implementing the functions specified in one or more flows of the flowcharts and/or one or more blocks of the block diagrams.

The computer program instructions may also be stored in a computer readable memory device capable of directing a computer or other programmable data processing apparatus to operate in a specific manner such that the instructions stored in the computer readable memory device produce an article of manufacture comprising instruction means imple-menting the functions specified in one or more flows of the flowcharts and/or one or more blocks of the block diagrams.

These computer program instructions can also be loaded onto a computer or other programmable device to perform a series of operation steps on the computer or other program-mable device to generate a computer-implemented process such that the instructions executed on the computer or other programmable device provide steps implementing the func-tions specified in one or more flows of the flowcharts and/or one or more blocks of the block diagrams. The above is merely preferred embodiments of this disclosure, and is not limitation to this disclosure. Within spirit and principles of this disclosure, any modification, replacement, improvement and etc shall be contained in the protection scope of this disclosure.

What is claimed is:

1. A communication method, comprising:

sending, by a first Base Station (BS), a broadcast message, wherein the broadcast message comprising: one or more Closed Access Group identities (CAG IDs) and one or more Public Land Mobile Network Identities (PLMN IDs) supported by the first BS;

receiving, by the first BS, a connection request sent from a terminal, wherein the connection request represents that the first BS supports at least one of one or more CAGs subscribed by the terminal;

establishing, by the first BS, a Radio Resource Control (RRC) connection with the terminal according to the connection request;

receiving, by the first BS, a RRC connection setup com-plete message sent from the terminal, wherein the RRC connection setup complete message carries a CAG ID and a PLMN ID, which correspond to a CAG cell that the terminal selects to access; and allowing, by the first BS, the terminal to access the CAG cell that the terminal selects to access, according to the RRC connection setup complete message;

receiving, by the first BS, a measurement report sent from the terminal, wherein the measurement report com-prises a CAG ID, a PLMN ID, and signal quality information, which correspond to each of one or more neighborhood cells measured by the terminal;

making a handover judgment and determining a cell corresponding to a third BS as a target cell according to the measurement report by the first BS;

sending, by the first BS, a handover required message to a core network element, to initiate a handover request to the third BS through the core network element, wherein the handover required message comprises an identifier of the target cell, in a case where the first BS judges that a handover condition is met, the handover request comprises a mobility restriction list, which comprises an Allowed CAG list of the terminal and an access mode indication of the terminal, wherein the Allowed CAG list comprises the one or more CAG IDs and one or more PLMN IDs subscribed by the terminal, the access mode indication comprises a CAG-only indication;

determining, by the third BS, that the terminal can only access a CAG cell, according to the access mode indication;

determining, by the third BS, whether to allow a handover of the terminal according to a comparison result between one or more CAG IDs and one or more PLMN IDs supported by the third BS and the Allowed CAG list of the terminal or a comparison result between a CAG ID and a PLMN ID supported by the target cell and the Allowed CAG list of the terminal;

sending, by the third BS, a handover request acknowledge message to the core network element in a case where the handover of the terminal is allowed; and receiving, by the first BS, a handover command returned by the core network element, and executing a handover process, wherein the handover command represents that the target cell supports a CAG of the one or more CAGs subscribed by the terminal.

2. The communication method according to claim 1, wherein allowing, by the first BS, the terminal to access the CAG cell that the terminal selects to access comprises:

sending, by the first BS, an initial user equipment (UE) message to a core network element, wherein the initial UE message comprises the CAG ID and the PLMN ID, which correspond to the CAG cell that the terminal selects to access, which are used for verifying whether a current access of the terminal is legal; and receiving, by the first BS, a downlink non-access stratum transport message sent from the core network element, and allowing the terminal to access the CAG cell that the terminal selects to access according to the downlink non-access stratum transport message, wherein the downlink non-access stratum transport message repre-sents that the current access of the terminal is legal.

3. The communication method according to claim 1, further comprising:

receiving, by the first BS, a measurement report sent from the terminal, wherein the measurement report com-prises: a CAG ID, a PLMN ID, and signal quality information, which correspond to each of one or more neighborhood cells measured by the terminal;

making a handover judgment and determining a cell corresponding to a second BS as a target cell according to the measurement report by the first BS;

sending, by the first BS, a handover request to the second BS, in a case of judging that a handover condition is met, wherein the handover request comprises an Allowed CAG list of the terminal, the Allowed CAG list of the terminal comprising one or more CAG IDs and one or more PLMN IDs subscribed by the terminal;

receiving, by the first BS, a handover request acknowledge message returned from the second BS; and handing over the terminal to the target cell by the first BS, according to the handover request acknowledge message, wherein the handover request acknowledge message represents that the target cell supports a CAG ID and a PLMN ID subscribed by the terminal.

4. The communication method according to claim 3, wherein the handover request further comprises an access mode indication of the terminal, the access mode indication comprising a CAG-only indication, and the method further comprising:

determining, by the second BS, that the terminal can only access a CAG cell according to the access mode indication;

determining, by the second BS, whether to allow a handover of the terminal according to a comparison result between one or more CAG IDs and one or more PLMN IDs supported by the second BS and the Allowed CAG list of the terminal, or a comparison result between a CAG ID and a PLMN ID supported by the target cell and the Allowed CAG list of the terminal; and sending, by the second BS, the handover request acknowledge message to the first BS, in a case that the handover of the terminal is allowed.

5. The communication method according to claim 3, wherein making a handover judgment and determining a cell corresponding to a second BS as a target cell according to the measurement report by the first BS, and sending, by the first BS, a handover request to the second BS, in a case of judging that a handover condition is met comprises:

making a handover judgment according to a matching result between the CAG ID and the PLMN ID, which correspond to the each of the one or more neighborhood cells measured by the terminal and the Allowed CAG list of the terminal, as well as the signal quality information corresponding to the each of the one or more neighborhood cells measured by the terminal, selecting the cell corresponding to the second BS as the target cell, in a case of judging that the handover condition is met, and sending the handover request to the second BS by the first BS, wherein the Allowed CAG list of the terminal is obtained by the first BS through an initial context setup request sent from the core network element.

6. The communication method according to claim 1, further comprising:

determining, by the core network element, whether a current handover of the terminal is legal according to a comparison result between one or more CAG IDs and one or more PLMN IDs supported by the third BS and an Allowed CAG list of the terminal or a comparison result between a CAG ID and a PLMN ID supported by the target cell and the Allowed CAG list of the terminal; and sending, by the core network element, the handover request to the third BS, in a case that the current handover of the terminal is legal, wherein the Allowed CAG list comprises the one or more CAG IDs and the one or more PLMN IDs subscribed by the terminal;

optionally, wherein the third BS sends the one or more CAG IDs supported by the third BS to the core network element through a Next Generation (NG) setup request or a Radio Access Network (RAN) configuration update message.

7. A base station (BS), comprising:

a processor; and a memory coupled to the processor and storing instructions that when executed by the processor, cause the processor to execute the communication method according to claim 1.

8. The communication method according to claim 2, wherein an Allowed CAG list of the terminal and an access mode indication of the terminal are added to a mobility restriction list of the downlink non-access stratum transport message, wherein the Allowed CAG list comprises one or more CAG IDs and one or more PLMN IDs subscribed by the terminal, and the access mode indication comprises a CAG-only indication.

9. The communication method according to claim 8, wherein whether the current access of the terminal is legal is determined according to a comparison result between the CAG ID and the PLMN ID, which correspond to the CAG cell that the terminal selects to access and the Allowed CAG list of the terminal.

10. A communication method, comprising:

receiving, by a terminal, a broadcast message sent from a first Base Station (BS), wherein the broadcast message comprising: one or more Closed Access Group identities (CAG IDs) and one or more Public Land Mobile Network Identities (PLMN IDs) supported by the first BS;

determining, by the terminal, whether the first BS supports at least one of one or more CAGs subscribed by the terminal according to the broadcast message;

if the first BS supports at least one of the one or more CAGs subscribed by the terminal, selecting, by the terminal, a CAG from the least one of the one or more CAGs subscribed by the terminal and supported by the first BS;

sending, by the terminal, a connection request to the first BS, and establishing a Radio Resource Control (RRC) connection with the first BS; and sending, by the terminal, a RRC setup complete message to the first BS, wherein the RRC setup complete message carries a CAG ID and a PLMN ID, which correspond to a CAG cell that the terminal selects to access, to instruct the first BS to connect the terminal to the CAG cell that the terminal selects to access;

sending, by the first BS, an initial user equipment (UE) message to a core network element, wherein the initial UE message comprises the CAG ID and the PLMN ID, which correspond to the CAG cell that the terminal selects to access, which are used for verifying whether a current access of the terminal is legal; and receiving, by the first BS, a downlink non-access stratum transport message sent from the core network element, and allowing the terminal to access the CAG cell that the terminal selects to access according to the downlink non-access stratum transport message, wherein the downlink non-access stratum transport message represents that the current access of the terminal is legal.

11. The communication method according to claim 10, wherein determining, by the terminal, whether the first BS supports least one of one or more CAGs subscribed by the terminal according to the broadcast message comprises:

determining, by the terminal, whether the first BS supports least one of the one or more CAGs subscribed by the terminal according to a comparison result between the one or more CAG IDs and the one or more PLMN IDs supported by the first BS and an Allowed CAG list of the terminal, wherein the Allowed CAG list comprises: one or more CAG IDs and one or more PLMN IDs subscribed by the terminal.

12. The communication method according to claim 10, further comprising:

sending, by the terminal, a measurement report to the first BS, wherein the measurement report comprises: a CAG ID, a PLMN ID, and signal quality information, which correspond to each of one or more neighborhood cells measured by the terminal, which is used for handing over the terminal by the first BS.

13. A communication system, comprising: a Base Station (BS) according to claim 7, and a terminal, wherein the terminal comprise:

a processor; and a memory coupled to the processor and storing instructions that when executed by the processor, cause the processor to execute the communication method according to claim 10.

14. The communication system according to claim 13, wherein the BS is a first BS, and the system further comprises:

a core network element configured to receive an initial user equipment (UE) message sent from the first BS, determine whether a current access of the terminal is legal according to the initial UE message, send a downlink non-access stratum transport message to the first BS, in a case where the current access of the terminal is legal, wherein the initial UE message comprises a CAG ID and a PLMN ID, which correspond to the CAG cell that the terminal selects to access.

15. The communication system according to claim 14, wherein:

the core network element is configured to determine whether the current access of the terminal is legal according to a comparison result between the CAG ID and the PLMN ID, which correspond to the CAG cell that the terminal selects to access and an Allowed CAG list of the terminal, wherein the Allowed CAG list comprises one or more CAG IDs and one or more PLMN IDs subscribed by the terminal; or the core network element is further configured to receive a handover required message sent from the first BS, send a handover request to a third BS according to the handover required message, receive a handover request acknowledge message sent from the third BS, and return a handover command to the first BS according to the handover request acknowledge message.

16. The communication system according to claim 14, further comprising:

a second BS configured to receive a handover request sent from the first BS, determine whether to allow a handover of the terminal according to the handover request, return a handover request acknowledge message to the first BS, in a case that the second BS allows the handover of the terminal, wherein the handover request comprises an Allowed CAG list of the terminal, and the Allowed CAG list comprises one or more CAG IDs and one or more PLMN IDs subscribed by the terminal.

17. The communication system according to claim 15, further comprising: the third BS, wherein:

the core network element is configured to determine whether a current handover of the terminal is legal according to between one or more CAG IDs and one or more PLMN IDs supported by the third BS and an Allowed CAG list of the terminal or a comparison result between a CAG ID and a PLMN ID supported by the target cell and the Allowed CAG list of the terminal, and send a handover request to the third BS, in a case that the current handover of the terminal is legal; or the third BS is configured to receive the handover request from the core network element, wherein the handover request comprises an Allowed CAG list of the terminal and an access mode indication of the terminal, and the access mode indication comprising a CAG-only indication, determine that the terminal can only access a CAG cell according to the access mode indication, determine whether to allow a handover of the terminal according to a comparison result between one or more CAG IDs and one or more PLMN IDs supported by the third BS and the Allowed CAG list of the terminal or a comparison result between a CAG ID and a PLMN ID supported by the target cell and the Allowed CAG list of the terminal, and send a handover request acknowledge message to the core network element, in a case that the handover of the terminal is allowed.

18. A terminal, comprising:

a processor; and a memory coupled to the processor and storing instructions that when executed by the processor, cause the processor to execute the communication method according to claim 10.

19. The communication system according to claim 16, wherein the handover request further comprises an access mode indication of the terminal, and the access mode indication comprising a CAG-only indication; and the second BS is configured to determine that the terminal can only access a CAG cell according to the access mode indication, determine whether to allow the handover of the terminal according to a comparison result between one or more CAG IDs and one or more PLMN IDs supported by the second BS and the Allowed CAG list of the terminal, or a comparison result between a CAG ID and a PLMN ID supported by the target cell and the Allowed CAG list of the terminal, and send the handover request acknowledge message to the first BS, in a case that the handover of the terminal is allowed.

* * * * *